US010625583B2

United States Patent
Sakuma (10) Patent No.: US 10,625,583 B2
(45) Date of Patent: Apr. 21, 2020

(54) INTERIOR TRIM MOUNTING STRUCTURE (71) Applicant: KASAI KOGYO CO., LTD., Kanagawa (JP)

(72) Inventor: Tomonari Sakuma, Sagamihara (JP)

(73) Assignee: KASAI KOGYO CO., LTD., Koza-Gun, Kanagawa (JP)

(*) Notice: Subject to any disclaimer, the term of this patent is extended or adjusted under 35 U.S.C. 154(b) by 17 days.

(21) Appl. No.: 16/304,446

(22) PCT Filed: Jun. 6, 2016

(86) PCT No.: PCT/JP2016/002726
§ 371 (c)(1),
(2) Date: Nov. 26, 2018

(87) PCT Pub. No.: WO2017/212505
PCT Pub. Date: Dec. 14, 2017

(65) Prior Publication Data
US 2019/0152305 A1 May 23, 2019

(51) Int. Cl.
*B60R 13/02* (2006.01)
*B60J 5/04* (2006.01)
(Continued)

(52) U.S. Cl.
CPC .............. *B60J 5/0461* (2013.01); *B60J 5/00* (2013.01); *B60J 5/04* (2013.01); *B60R 13/02* (2013.01);
(Continued)

(58) Field of Classification Search
CPC ... B60J 5/0461; B60J 5/0451; B60R 13/0243; E05B 85/12
(Continued)

(56) References Cited

U.S. PATENT DOCUMENTS 7,222,910 B1 * 5/2007 Doan .................... B60N 2/4235
296/153
2005/0023861 A1 2/2005 Hirotani et al.
(Continued)

FOREIGN PATENT DOCUMENTS

DE 602004009865 T2 6/2008
EP 1502807 A1 2/2005
(Continued)

OTHER PUBLICATIONS

International Search Report for International Application No. PCT/JP2016/002726 dated Jul. 26, 2016, Japan.

*Primary Examiner* — Hilary L Gutman
(74) *Attorney, Agent, or Firm* — United IP Counselors, LLC (57) ABSTRACT

A mounting structure of interior trim includes a handle-shaped grip arranged on the interior trim and a bracket connecting a vehicle body panel and the grip. The grip has a fixing base. The fixing base includes a base portion, a cylindrical boss portion, and an opening. The bracket includes a grip attachment part arranged on the fixing base, a pair of panel attachment portions arranged at both ends of the bracket, each of the panel attachment portions attached to the vehicle body panel, and a pair of connecting pieces straddling between the pair of the panel attachment portions with the grip attachment portion sandwiched in the center. One of the pair of connecting pieces has a fragile portion that becomes a deformation starting point of the bracket when a load is applied from the fixing base to the grip attachment portion.

3 Claims, 7 Drawing Sheets (51) Int. Cl.
*E05B 85/12* (2014.01)
*B60J 5/00* (2006.01)

(52) U.S. Cl.
CPC .......... *B60R 13/0243* (2013.01); *E05B 85/12* (2013.01); *B60J 5/0451* (2013.01)

(58) Field of Classification Search
USPC .................. 296/146.6, 146.7, 1.08, 1.09
See application file for complete search history.

(56) References Cited

U.S. PATENT DOCUMENTS

| | | | |
|---|---|---|---|
| 2006/0290167 A1 | 12/2006 | Hirotani et al. | |
| 2008/0022602 A1* | 1/2008 | Senoo | B60R 13/0206 49/502 |
| 2009/0134660 A1* | 5/2009 | Pinkerton | B60N 2/4235 296/146.7 |
| 2010/0133875 A1* | 6/2010 | Bouillon | B60R 13/0206 296/187.01 |
| 2011/0094061 A1* | 4/2011 | Yamaguchi | B60J 5/0468 16/421 |
| 2011/0221230 A1* | 9/2011 | Kato | B60R 13/0243 296/146.7 |
| 2012/0326461 A1* | 12/2012 | Orlowsky | B60N 3/026 296/1.02 |
| 2014/0215769 A1* | 8/2014 | Lee | B60R 13/0206 24/289 |
| 2019/0047447 A1* | 2/2019 | Faruque | B60N 2/777 |
| 2019/0118752 A1* | 4/2019 | Tay | B60R 13/0243 |
| 2019/0344643 A1* | 11/2019 | Masuda | B60R 13/0206 |

FOREIGN PATENT DOCUMENTS

| | | |
|---|---|---|
| JP | S62-27959 U | 2/1987 |
| JP | H5-5528 U | 1/1993 |
| JP | H5-41917 U | 6/1993 |
| JP | 2005-67348 A | 3/2005 |

* cited by examiner

INTERIOR TRIM MOUNTING STRUCTURE

CROSS-REFERENCE TO RELATED APPLICATIONS

This application is a National Stage Entry application of PCT International Application No. PCT/JP2016/002726, filed on Jun. 6, 2016, the entire contents of which are hereby incorporated by reference.

BACKGROUND

1. Technical Field

The present invention relates to an interior trim mounting structure.

2. Description of the Background

Conventionally, as an interior trim mounting structure, for example, a structure related to a vehicle side door is known. The vehicle side door includes a door panel, which is a vehicle body panel, and a door trim, which is an interior trim, mounted on the interior side of the door panel. Some of these door trims includes a handle door grip, and an occupant in the vehicle compartment opens and closes the side doors by pushing or pulling the door grip.

In order to transmit the force for operating the door grip to the door panel, a direct mounting structure may be used for the door trim, but due to restrictions on vehicle layout, a method of mounting a door grip to a door panel via a bracket is also known.

For example, Japanese Utility Model Publication No. S62-27959 (hereinafter referred to as "Patent Literatures 1") and Japanese Utility Model Publication No. H5-41917 (hereinafter referred to as "Patent Literature 2") disclose a door trim mounting structure provided with a door grip. In this mounting structure, a bracket that is bent into a convex shape is fixed to the door inner panel in an arch shape, and a top portion of the bracket is connected to an end portion of the door grip.

BRIEF SUMMARY

When closing the side door, a force in the pulling direction is applied to the door grip. On the other hand, when a side collision of the vehicle occurs, a force in the pushing direction is applied to the door grip. In a mounting structure using a bracket, these forces are transmitted to the door panel via the bracket.

The conventional mounting structure has a structure that can withstand the force in the pulling direction, and it is possible to secure the rigidity of the door grip. However, the bracket is stretched against the force in a direction of the pushing, thus the energy caused by side collision may not sufficiently be absorbed.

The present invention has been made in view of such circumstances, and an object of the present invention is to provide an interior trim mounting structure capable of achieving compatibility between rigidity of a grip and energy absorption performance.

In order to solve such a problem, the present invention provides a mounting structure of an interior trim attached to the interior side of a vehicle body panel. The mounting structure of the interior trim includes a handle-shaped grip arranged on the interior trim, and a bracket arranged in a space between the vehicle body panel and the interior trim, the bracket connecting the vehicle body panel and the grip. The bracket includes a grip attachment portion arranged on a fixing base of the grip, a pair of panel attachment portions arranged at both ends of the bracket, each of the panel attachment portions attached to the vehicle body panel, and a pair of connecting pieces straddling between the pair of the panel attachment portions with the grip attachment portion sandwiched in the center. One of the pair of connecting pieces has a fragile portion that becomes a deformation starting point of the bracket when a load is applied from the fixing base to the grip attachment portion.

In the present embodiment, it is preferable that the fragile portion has bent shape by bending one of the pair of connecting pieces along folding line extending in a direction perpendicular to the longitudinal direction of the connecting piece.

Further, in the present embodiment, it is preferable that the fixing base includes a base portion having a flat shape, a cylindrical boss portion connected to a peripheral portion of the base portion, and an opening formed by removing a part of the boss portion.

Further, in the present embodiment, it is preferable that the opening is arranged in the direction in which the one of the pair of connecting pieces is arranged.

An interior trim mounting structure according to the present invention can achieve both of the rigidity of the grip and the energy absorption performance.

DETAILED DESCRIPTION

Figure 1:
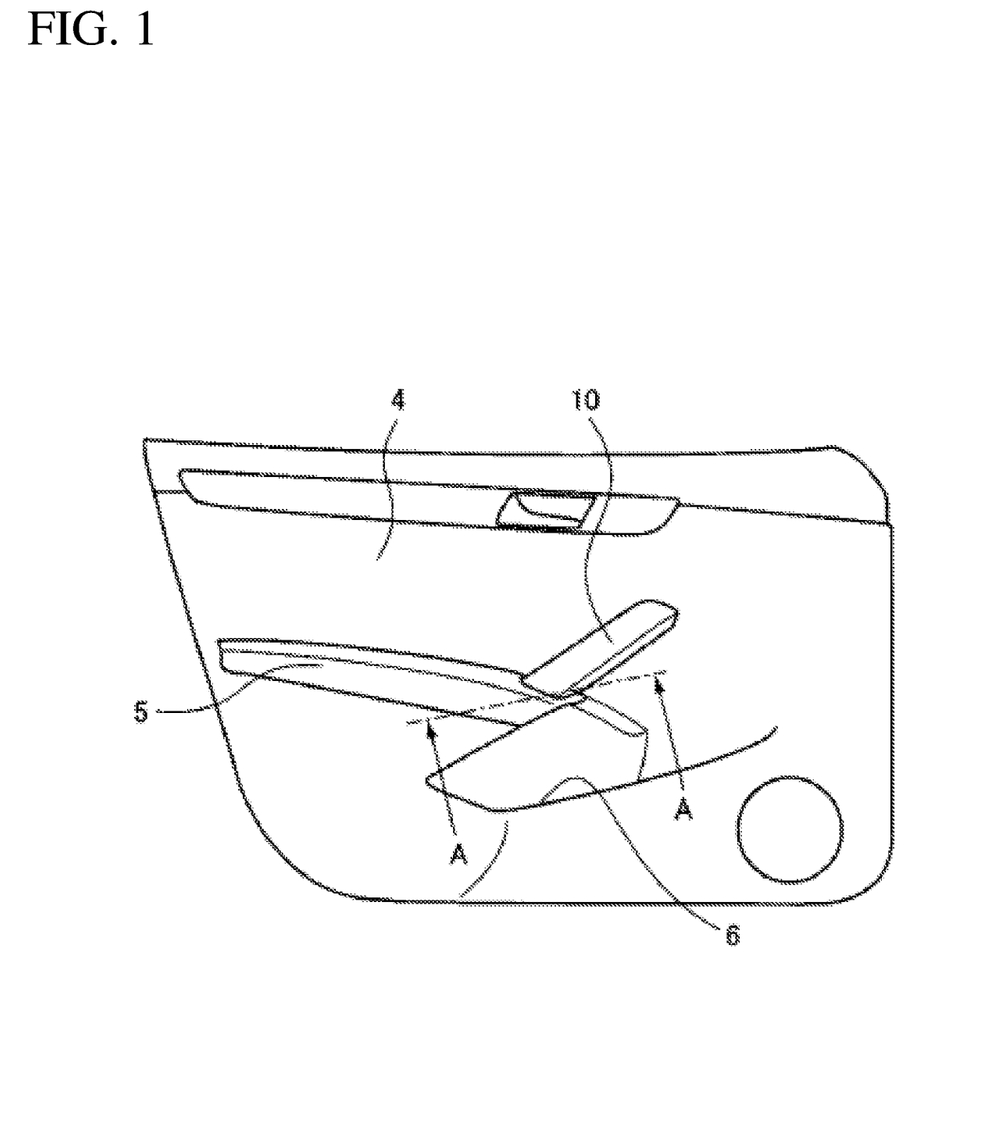
FIG. 1 is a side view schematically showing a side door according to the present embodiment.
Figure 2:
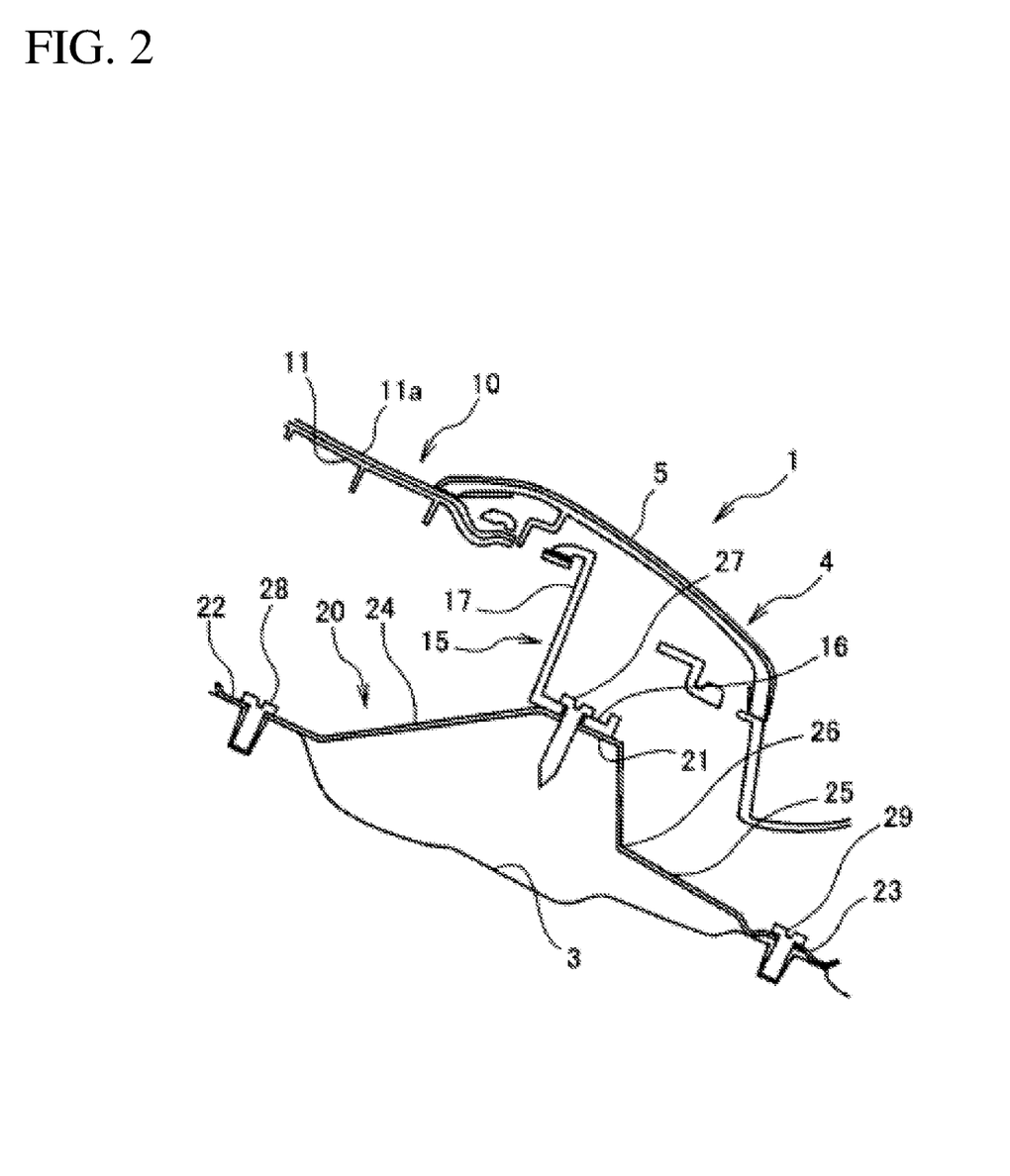
FIG. 2 is a sectional view taken along the line AA shown in FIG. 1.
Figure 3:
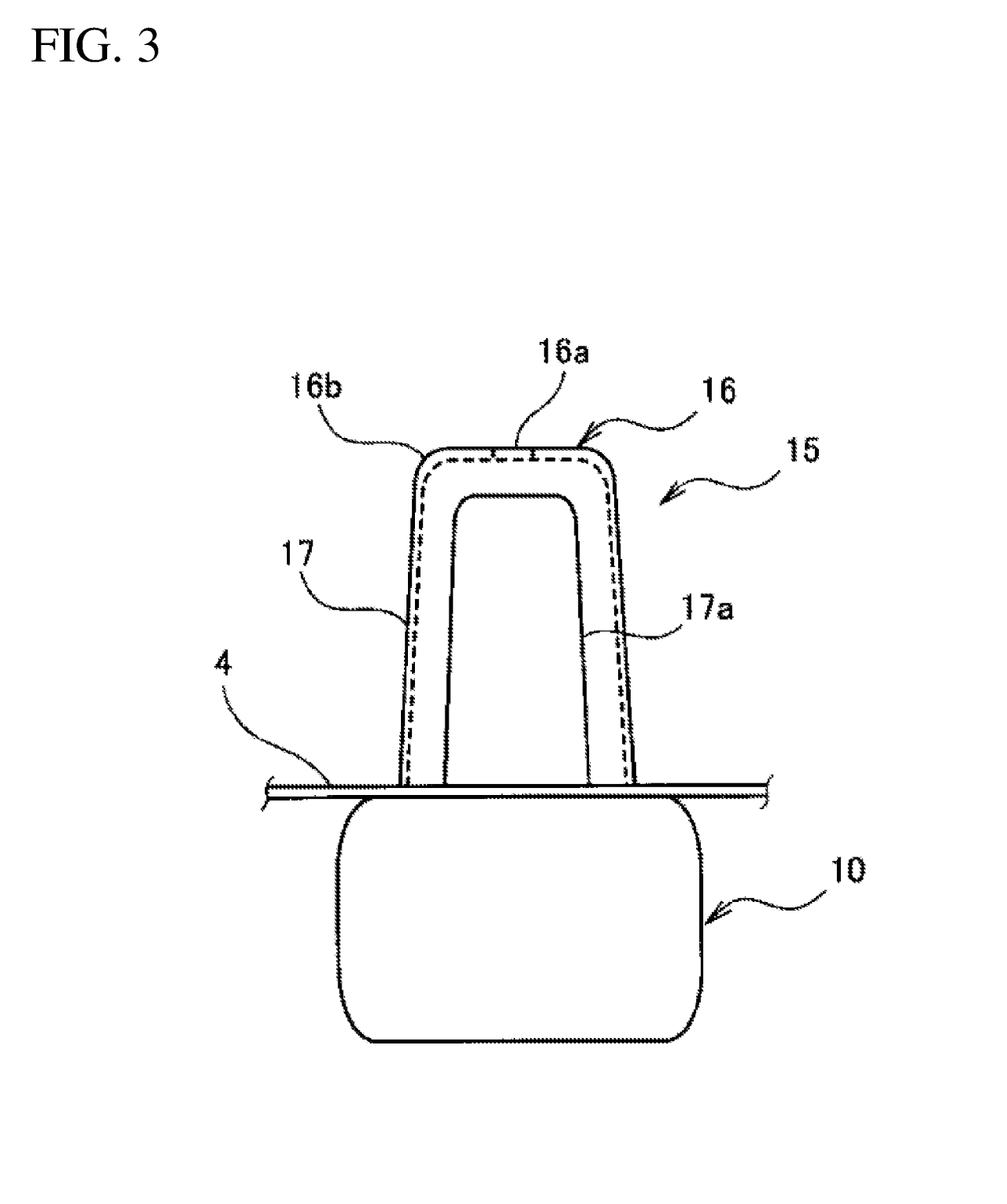
FIG. 3 is an explanatory view schematically showing a configuration of the fixing base.
Figure 4:
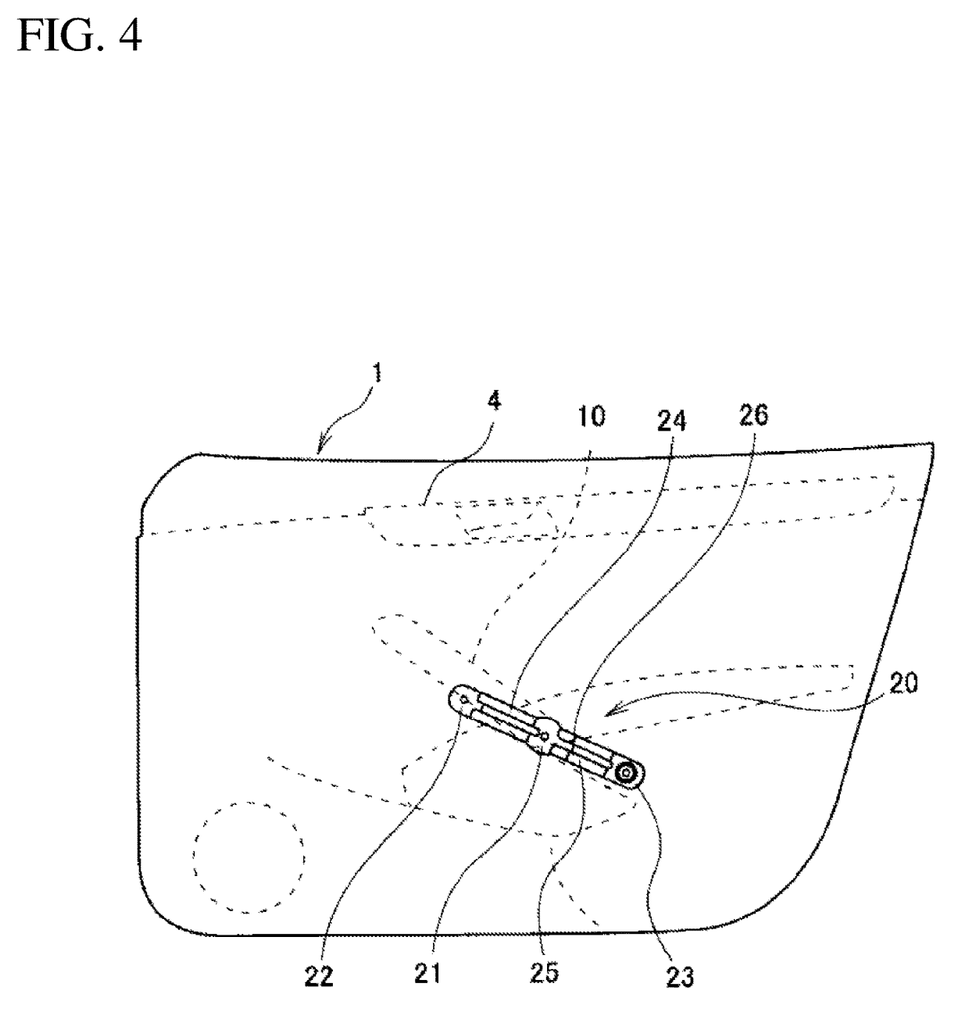
FIG. 4 is an explanatory view showing the bracket from the back side of the door trim.
Figure 5:
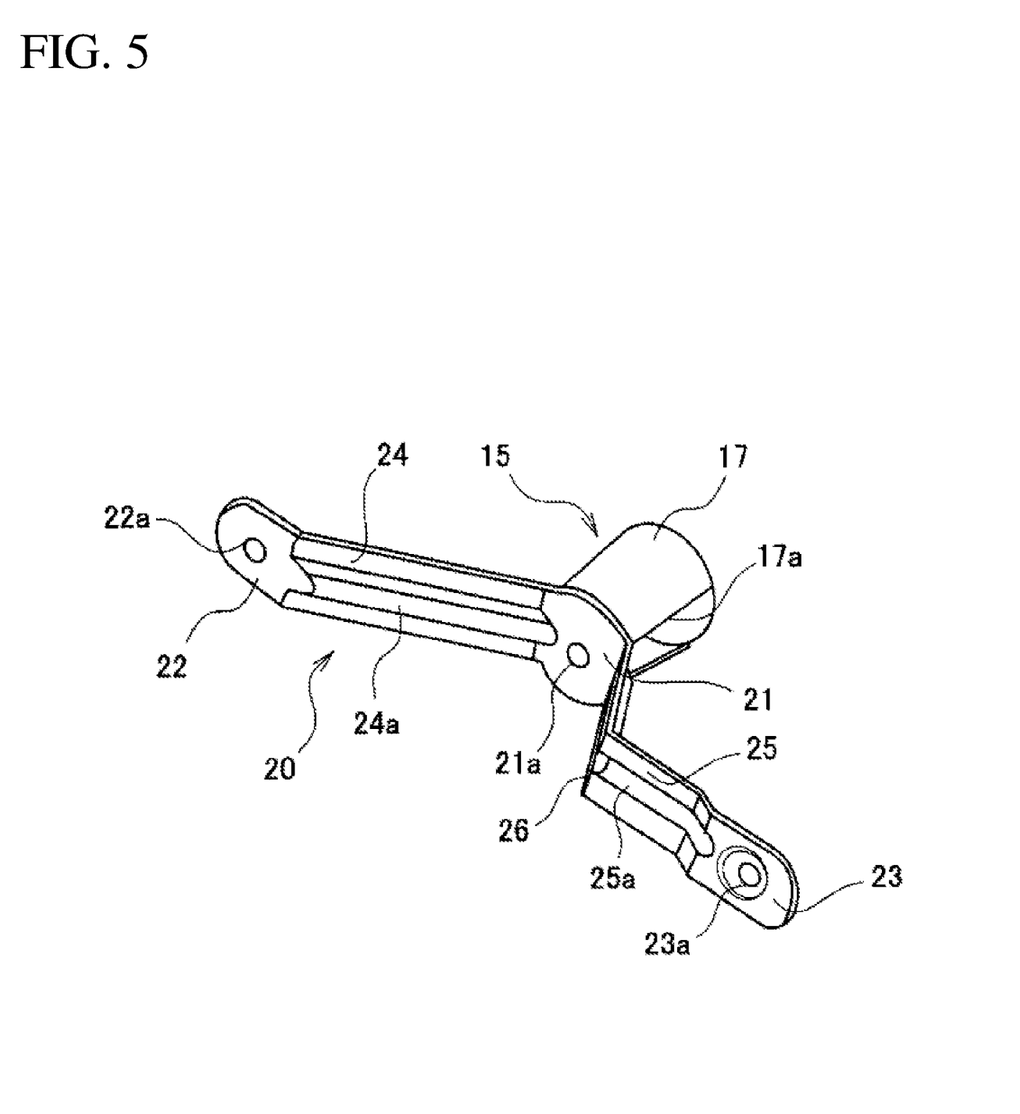
FIG. 5 is a perspective view schematically showing a bracket and the fixing base.

Hereinafter, an interior trim mounting structure (door trim 4) applied to a side door 1 of the automobile will be described. FIG. 1 is a side view schematically showing the side door 1 according to the embodiment, and FIG. 2 is a sectional view taken along line AA shown in FIG. 1. FIG. 3 is an explanatory view schematically showing a configuration of the fixing base 15. FIG. 4 is an explanatory view showing the bracket 20 from the back side of the door trim 4, and FIG. 5 is a perspective view schematically showing the bracket 20 and the fixing base 15.

The side door 1 includes a door outer panel (not shown), which is a door panel, and a door inner panel 3. The door inner panel 3 constitutes a part of a wall panel of the vehicle interior, and a door trim 4 is mounted on the vehicle interior side of the door inner panel 3.

The door trim 4 is formed by molding using an appropriate synthetic resin material, and a skin material (not shown), which serves as a cushion and a facing, is adhered to the side surface (front surface) on the cabin side. The door trim 4 includes a door armrest 5 at a vertically intermediate portion. The door trim 4 includes a door pocket 6 at a position lower than the door armrest 5.

The door trim 4 includes a handle-shaped door grip 10. The door grip 10 has a lower end located at the front end of the door armrest 5, and the door grip 10 is arranged so as to be inclined upward toward the front of the vehicle. The door grip 10 is mainly composed of a grip base 11 which projects in a curved shape toward the inside of the room, and the lower end of the grip base 11 is covered with a door armrest 5. The grip base 11 is covered with a skin material 11a covering the surface of the grip base 11.

A fixing base 15 protruding in a convex shape toward the door inner panel 3 is provided at the lower end portion of the door grip 10. The fixing base 15 is a part for fixing the door grip 10 to the door inner panel 3 via the bracket 20.

The fixing base 15 is integrally formed on the rear surface side of the lower end portion of the door grip 10, and includes a base portion 16 and a boss portion 17. The base portion 16 has a flat plate shape that is substantially circular, and a through hole 16a for screw insertion is formed in the center thereof. The boss portion 17 has a substantially cylindrical shape such that the distal end portion side is constricted, and the distal end portion is connected to the peripheral portion 16b of the base portion 16.

Further, an opening 17a, which is formed by removing a part of the boss portion 17, is formed at the fixing base 15. The opening 17a has a range that includes a height from the base end portion of the boss portion 17 (a portion connected to the door grip 10) to the vicinity of the front end portion of the boss portion 17 and a predetermined width along the circumferential direction. The opening 17a may be arranged at any position on the peripheral wall surface of the boss portion 17, but in the present embodiment, the arranged direction of the opening 17a (the direction in which the opening faces) and a second connecting piece 25, which is explained later, are arranged to be substantially coincident with each other.

The bracket 20 is disposed in a space between the door inner panel 3 and the door trim 4, and connects the door inner panel 3 and the door grip 10 (the fixing base 15). The bracket 20, which is a band-like plate material bent into a convex shape, is formed of a metal having excellent rigidity such as stainless steel. The bracket 20 includes a grip attachment portion 21, a pair of panel attachment portions 22, 23 (a first panel attachment portion 22, a second panel attachment portion 23), and a pair of connecting pieces 24, 25 (a first connecting piece 24, a second connecting piece 25).

The grip attachment portion 21, which is arranged at substantially the center in the longitudinal direction of the bracket 20, is a portion for attaching the bracket 20 to the fixing base 15 of the door grip 10. The grip attachment portion 21, which has a substantially flat surface shape, serves as a contact surface to the base portion 16 of the fixing base 15. A through hole 21a for screw insertion is formed in the center of the grip attachment portion 21. The grip attachment portion 21 corresponds to the top portion of the convex bracket 20.

The pair of panel attachment portions 22, 23, which are arranged at both ends in the longitudinal direction of the bracket 20, are portions for attaching the bracket 20 to the door inner panel 3. Each of the panel attachment portions 22, 23 has a substantially flat surface shape and serves as a contact surface with the door inner panel 3. Through holes 22a, 23a for screw insertion are formed in the center of each panel attachment portions 22, 23.

The pair of connecting pieces 24, 25 are arranged at an intermediate portion between the grip attachment portion 21 and the panel attachment portions 22, 23. The pair of connecting pieces 24, 25 are configured to straddle in an arch shape between the pair of panel attachment portions 22, 23 with the grip attachment portion 21 sandwiched in the center.

The first connecting piece 24 connects the first panel attachment portion 22 and the grip attachment portion 21. The first connecting piece 24 is arranged to be inclined upward from the first panel attachment portion 22 to the grip attachment portion 21. The connection portion between the first connecting piece 24 and the first panel attachment portion 22 and the connection portion between the first connecting piece 24 and the grip attachment portion 21 are respectively bent, and the first connecting piece 24 has straight shape.

The first connecting piece 24 has a convex bulging portion 24a that extends continuously along the longitudinal direction thereof. The bulging portion 24a is arranged to increase the rigidity of the first connecting piece 24.

The second connecting piece 25 connects the second panel attachment portion 23 and the grip attachment portion 21. The second connecting piece 25 is arranged to be inclined generally upward from the second panel attachment portion 23 to the grip attachment portion 21. The connecting portion between the second connecting piece 25 and the second panel attachment portion 23 and the connecting portion between the second connecting piece 25 and the grip attachment portion 21 are respectively bent, and the second connecting piece 25 is substantially L-shaped.

A bent portion 26 is provided in the central portion of the second connecting piece 25. The bent portion 26 is formed by bending the second connecting piece 25 along a folding line extending in a direction orthogonal to the longitudinal direction of the second connecting piece 25. In the present embodiment, the bent portion 26 is bent in a valley fold shape as viewed from the door trim 4 side so that the second connecting piece 25 approaches the door inner panel 3.

When a load is applied from the fixing base 15 to the grip attachment portion 21, the bent portion 26 constitutes a fragile portion which becomes a deformation starting point of the bracket 20 by stress concentrating on the bent portion 26. That is, the second connecting piece 25 having a bent portion 26 is weaker than the first connecting piece 24.

In addition, the second connecting piece 25 has a concave recessed portion 25a extending continuously along its longitudinal direction. The recessed portion 25a is arranged to increase the rigidity of the second connecting piece 25.

The bracket 20 is arranged in the space portion between the door inner panel 3 and the door trim 4 while the pair of panel attachment portions 22, 23 are directed to the door inner panel 3 side and the grip attachment portion 21 is directed to the door trim 4 side (see FIG. 2). In this case, the pair of panel attachment portions 22, 23 are in contact with predetermined portions of the door inner panel 3, respectively, and the grip attachment portion 21 is in contact with the base portion 16 of the fixing base 15. Then, each of the panel attachment portions 22, 23 is screwed to the door inner panel 3 with the screws 28, 29, and the grip attachment portion 21 is screwed to the base portion 16 by the screw 27.

Figure 6:
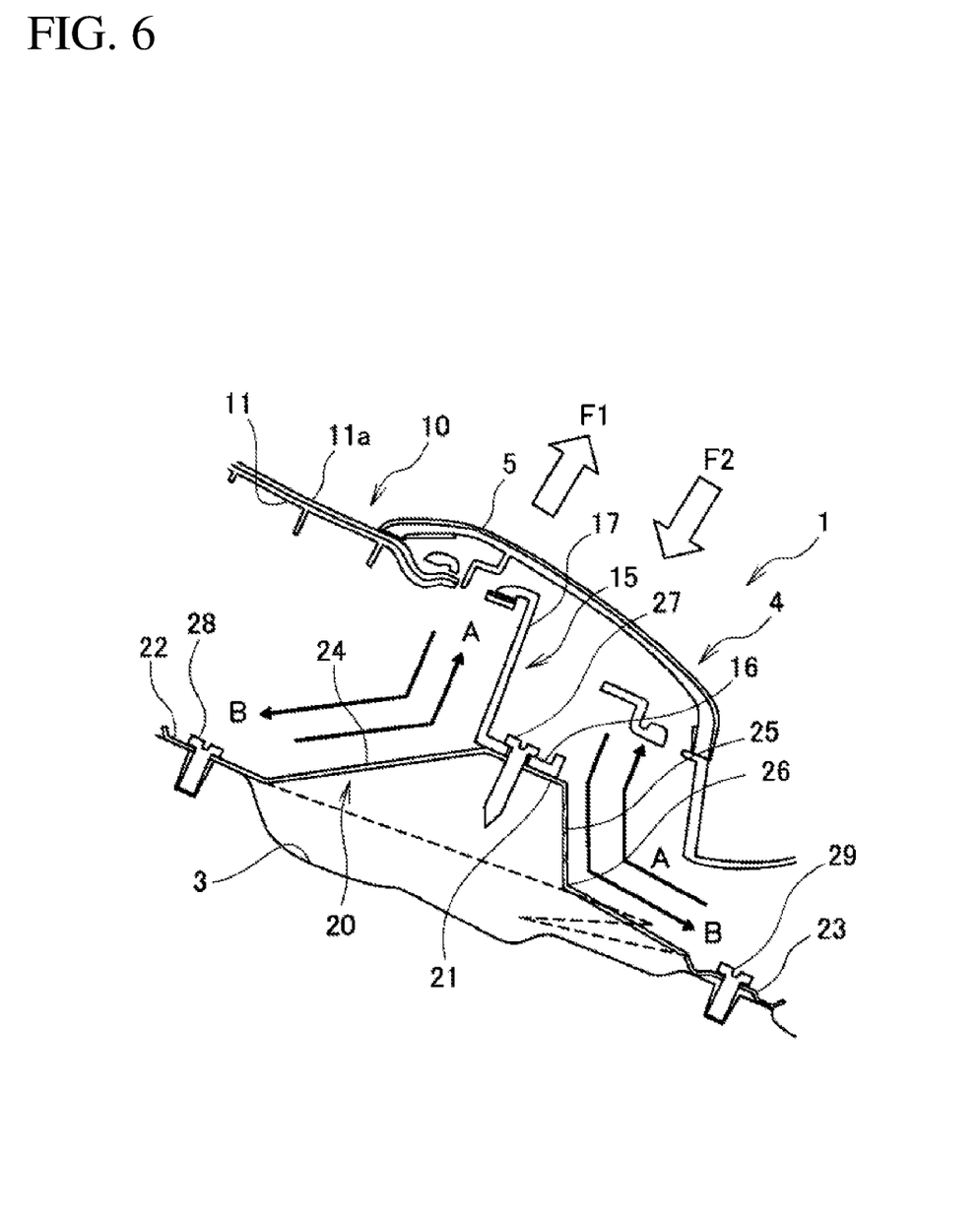
FIG. 6 is an explanatory diagram schematically showing the force applied to the door grip.

FIG. 6 is an explanatory view schematically showing the force applied to the door grip 10. Hereinafter, the function of the mounting structure of the door trim 4 according to the present embodiment will be described.

First, when the side door 1 is closed, a force F1 in the pulling direction acts on the door grip 10. The force F1 acts on the door inner panel 3 as a force (transmission force) A shown in the figure via the bracket 20.

At this time, the door grip 10 and the door inner panel 3 are joined at three points via the bracket 20, and the top of the arch-shaped (convex) bracket 20 is pulled, which achieves excellent structure in tolerance against the transmission force A. Therefore, the door inner panel 3 and the door grip 10 are firmly connected, and the rigidity of the door grip 10 is secured.

On the other hand, in the case of a side collision of the vehicle, the door inner panel 3 moves to the cabin side and the door grip 10 interferes with the object on the cabin side, thus a force F2 in the pushing direction acts on the door grip 10. The force F2 acts on the door inner panel 3 as a force (transmission force) B shown in the figure via the bracket 20.

At this time, since the opening 17a is formed in the boss portion 17 of the fixing base 15, there is a fragile portion as compared with the structure in which the entire circumference is covered with the wall surface. Therefore, by applying the force F2, the fixing base 15 buckles with the opening 17a as a starting point. Also, by applying the load from the fixing base 15 to the grip attachment portion 21, the transmission force B is transmitted to the pair of connecting pieces 24, 25. At this time, stress concentrates on the bent portion 26 of the second connecting piece 25 out of the pair of connecting pieces 24, 25. Therefore, the bent portion 26 of the second connecting piece 25 serves as a starting point, and the bracket 20 buckles (indicated by a broken line in FIG. 6). As a result, the fixing base 15 and the bracket 20 are crushed and deformed in an orderly manner. As a result, a sufficient stroke in the collapsing direction can be ensured, and energy caused by the force F2 can be adequately absorbed.

As described above, the interior trim mounting structure according to the present embodiment relates to the mounting structure of the door trim 4 mounted to the interior side of the door inner panel 3.

The mounting structure of the door trim 4 includes a handle-shaped door grip 10 arranged on the door trim 4, a bracket 20 arranged on a space portion disposed between the door inner panel 3 and the door trim 4, and connecting the door inner panel 3 and the door grip 10. The bracket 20 includes a grip attachment portion 21 attached to a fixing base 15 disposed on the door grip 10, a pair of panel attachment portions 22, 23, which are arranged at both ends of the bracket 20, attached to the door inner panel 3, and a pair of connecting pieces 24, 25 which are arranged between the pair of panel attachment portions 22, 23 in an arched manner while positioning the grip attachment portion 21 in the middle.

One of the connecting pieces (the second connecting piece) 25 of the pair of connecting pieces 24, 25 has a fragile portion which becomes a deformation starting point of the bracket 20 when a load is applied from the fixing base 15 to the grip attachment portion 21.

Here, the fragile portion is a bent portion 26 that is formed by bending the second connecting piece 25 along folding line extending in a direction perpendicular to the longitudinal direction of the second connecting piece 25.

Figure 7:
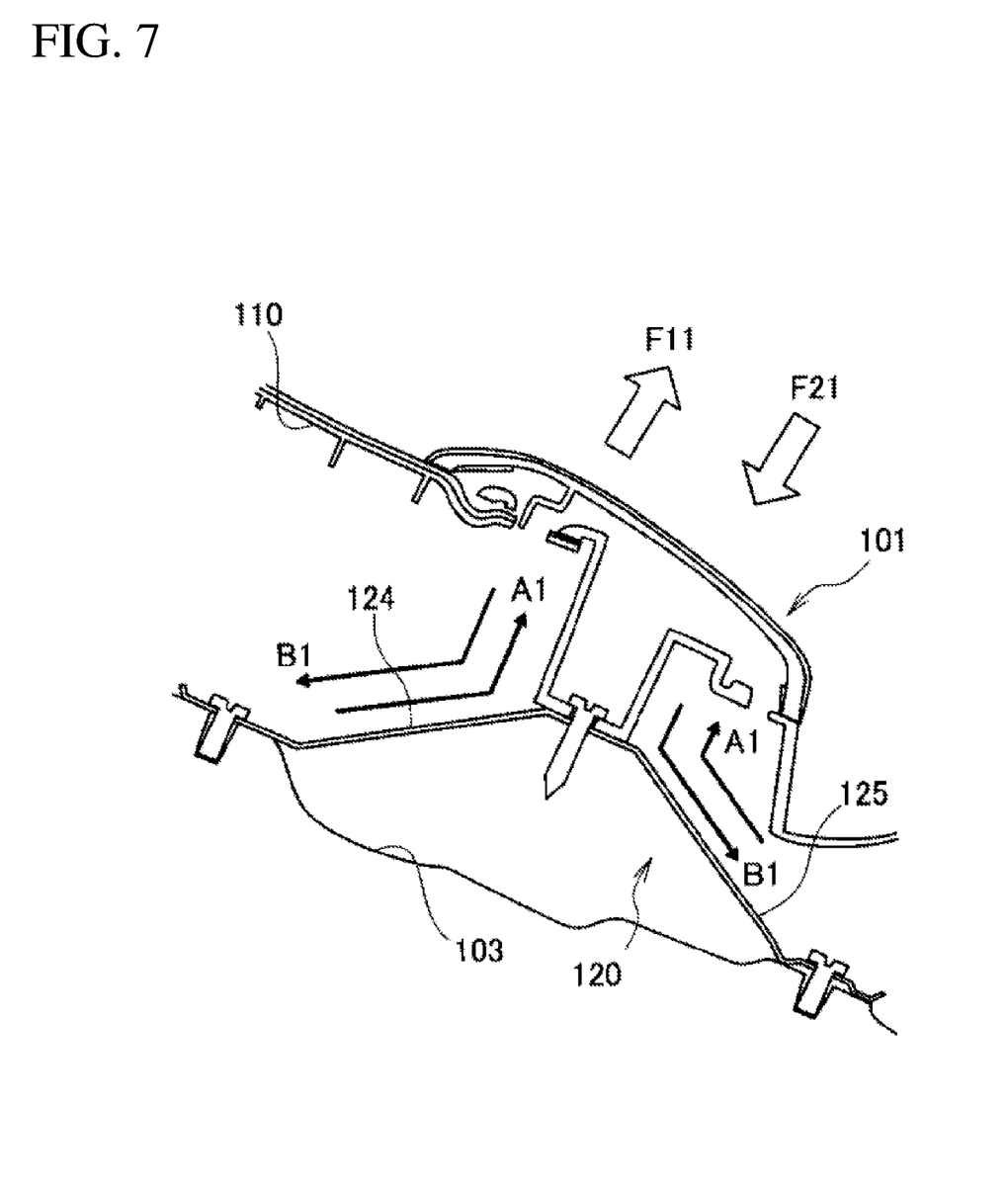
FIG. 7 is an explanatory diagram for explaining a door trim mounting structure using a bracket having no bent portion at a connecting piece.

FIG. 7 is an explanatory diagram for explaining the door trim mounting structure using a bracket 120 having no the bent portion at the connecting piece. First, when the side door 101 is closed, a force F11 in the pulling direction acts on the door grip 110. This force F11 acts on the door inner panel 103 as a force (transmission force) A1 shown in the figure via the bracket 120. Each of the pair of connecting pieces 124, 125 of the bracket 120 has a straight shape and is symmetrical.

In this case, the door grip 110 and the door inner panel 103 are joined at three points via the bracket 120, and the top of the arch-shaped (convex) bracket 20 is pulled, which achieves excellent structure in tolerance against the transmission force A1. As a result, the rigidity of the door grip 10 is secured.

On the other hand, in the case of a side collision of the vehicle, the door inner panel 103 moves to the cabin side, and a force F21 in the pushing direction acts on the door grip 110. The force F21 acts on the door inner panel 103 as a force (transmission force) B1 shown in the figure via the bracket 120.

However, in the case of the configuration shown in FIG. 7, since the pair of connecting pieces 124, 125 are made rigidly, they are stretched against the transmitting force B1, and there is a possibility that the bracket 120 is not effectively crushed and deformed. Therefore, there is a possibility that the energy caused by the force F21 cannot be adequately absorbed.

According to the present embodiment, by applying the load from the fixing base 15 to the grip attachment portion 21, the stress concentrates the bent portion 26 (fragile portion) of the second connecting piece 25 out of the pair of connecting pieces 24, 25. Therefore, the bent portion 26 of the second connecting piece 25 serves as a deformation starting point, and the bracket 20 buckles. Thus, the bracket 20 is crushed and deformed in an orderly manner. As a result, a sufficient stroke in the collapsing direction is ensured, and energy caused by the force F2 is adequately absorbed.

In this embodiment, a bent portion 26 having a curved shape is adopted as the structure for realizing the fragile portion. However, it is possible to adopt various fragile structures which become the deformation starting point of the bracket 20, such as thinning and forming a notch.

Further, in the present embodiment, the fixing base 15 includes a flat base portion 16, a cylindrical boss portion 17 connected to the peripheral portion 16b of the base portion 16, and an opening 17a formed by removing a part of the boss portion 17.

According to this configuration, since the opening 17a is arranged in the boss portion 17 of the fixing base 15, there is a portion that is weaker than the structure in which the entire circumference of the boss portion 17 is covered with the wall surface. Therefore, by applying the force F2, the fixing base 15 buckles with the opening 17a as a starting point. Thus, the fixing base 15 is crushed and deformed in an orderly manner. As a result, a sufficient stroke in the collapsing direction is ensured, and energy caused by the force F2 is adequately absorbed.

Further, in the present embodiment, the opening 17a is arranged in the direction in which the second connecting piece 25 is arranged.

According to this configuration, it is possible to promote crush deformation of the fixing base 15 and the bracket 20 in the same direction. As a result, a sufficient stroke in the collapsing direction is ensured, and energy caused by the force F2 is adequately absorbed.

Although the interior trim mounting structure of the embodiment has been described above, the present invention is not limited to this embodiment, and various modifications are possible within the scope of the invention. For example, in the present embodiment, the bracket is applied to the fixing structure of the lower end portion of the door grip, but a similar structure may be applied to the upper end portion of the door grip.

Further, in the present embodiment, the interior trim mounting structure is applied to the side door, but the interior trim mounting structure according to the present invention may be applied to the interior trim mounting portion having the grip other than the side door.

REFERENCE SIGNS LIST

1 Side door
3 Door inner panel
4 Door trim
10 Door grip
11 Grip base
11a Skin material
15 Fixing base
16 Base portion
16b Peripheral portion
17 Boss portion
17a Opening
20 Bracket
21 Grip attachment portion
22 First panel attachment portion
23 Second panel attachment portion
24 First connecting piece
25 Second connecting piece
26 Bent portion

The invention claimed is:

1. A mounting structure of interior trim attached to an interior side of a vehicle body panel, the mounting structure comprising:

a handle-shaped grip arranged on the interior trim, the grip having a fixing base, the fixing base including a base portion having a flat shape, a cylindrical boss portion connected to a peripheral portion of the base portion, and an opening formed by removing a part of the boss portion;

a bracket arranged in a space between the vehicle body panel and the interior trim, the bracket connecting the vehicle body panel and the grip, the bracket including a grip attachment portion arranged on the fixing base, a pair of panel attachment portions arranged at both ends of the bracket, each of the panel attachment portions attached to the vehicle body panel, and a pair of connecting pieces straddling between the pair of the panel attachment portions with the grip attachment portion sandwiched in the center;

wherein one of the pair of connecting pieces has a fragile portion that becomes a deformation starting point of the bracket when a load is applied from the fixing base to the grip attachment portion.

2. The mounting structure according to claim 1, wherein the fragile portion has a bent shape by bending one of the pair of connecting pieces along a folding line extending in a direction perpendicular to the longitudinal direction of the one of the pair of connecting pieces.

3. The mounting structure according to claim 1, wherein the opening is arranged in the direction in which the one of the pair of connecting pieces is arranged.

* * * * *